United States Patent
Wisz

[11] Patent Number: 5,465,996
[45] Date of Patent: Nov. 14, 1995

[54] COOLER CARRIER APPARATUS

[76] Inventor: William Wisz, 81 Liddell St., Buffalo, N.Y. 14212

[21] Appl. No.: 238,512
[22] Filed: May 5, 1994
[51] Int. Cl.$^6$ ..................................... B62B 3/02
[52] U.S. Cl. ........................ 280/651; 280/35; 280/47.34
[58] Field of Search ................................ 280/35, 47.34, 280/47.35, 47.315, 47.26, 656, 651; 62/239, 457.1, 457.7; 190/18 A, 39, 115; 180/906

[56] References Cited

U.S. PATENT DOCUMENTS

| | | | |
|---|---|---|---|
| 2,730,373 | 1/1956 | Blevins et al. | 280/35 |
| 2,772,889 | 12/1956 | Reynolds | 280/35 |
| 3,400,942 | 9/1968 | Hull | 280/35 |
| 3,720,422 | 3/1973 | Nelson | 280/35 |
| 3,891,245 | 6/1975 | Elsas . | |
| 3,963,256 | 6/1976 | Stafford | 280/35 |
| 4,451,053 | 5/1984 | Alioa et al. | 280/47.315 |
| 4,724,681 | 2/1988 | Bartholomew et al. | 280/47.17 |
| 4,796,909 | 1/1989 | Kirkendall | 280/651 |
| 4,846,493 | 7/1989 | Mason | 280/641 |
| 5,018,930 | 5/1991 | Hardin et al. | 280/47.26 |
| 5,169,164 | 12/1992 | Bradford | 280/35 |
| 5,249,823 | 10/1993 | McCoy et al. | 280/656 |
| 5,299,817 | 4/1994 | Chang | 280/35 |

Primary Examiner—Margaret A. Focarino
Assistant Examiner—Carla Mattix

[57] ABSTRACT

A new and improved container carrier apparatus includes a first support assembly, a second support assembly, a third support assembly which is connected between the first support assembly and the second support assembly. The third support assembly is connected to the first support assembly and the second support assembly such that the third support assembly, the first support assembly, and the second support assembly are coplanar in a support plane. Pairs of lateral retention assemblies are connected to the first and second support assemblies. The lateral retention assemblies project perpendicularly from the support plane. A hinge assembly is connected to either the first support assembly or the second support assembly. A handle assembly is connected to the hinge assembly, and four wheels are attached to respective end portions of the first and second support assemblies. The third support assembly includes a first portion, a second portion, and a third portion telescopically connected between the first portion and the second portion such that an effective length of the third support assembly can be adjusted. Clamping assemblies are connected to the lateral retention assemblies for clamping a container between the respective lateral retention assemblies and onto the support assemblies. Each of the clamping assemblies includes a pair of threaded apertures in the lateral retention assemblies and a complementarily threaded bolt adapted to be screwed through the threaded apertures and to extend to contact a container supported by the first, second, and third support assemblies.

7 Claims, 4 Drawing Sheets

COOLER CARRIER APPARATUS

BACKGROUND OF THE INVENTION

1. Field of the Invention

The present invention relates generally to wheeled carriers and, more particularly, to wheeled carriers especially adapted for carrying a portable cooler.

2. Description of the Prior Art

Portable coolers are commonly used away from sources of electric power for keeping food and beverages cool. Common uses of portable coolers are at picnics, at a beach, and at stadium events. However, a cooler filled with ice, food, and beverages may be quite heavy. Often such a filled cooler requires two people to carry it and often with much inconvenience. In this respect, it would be desirable if a device were provided that permitted transport of a heavy cooler without needing two people to carry the cooler.

Coolers come in many sizes. Generally, however, coolers are substantially box shaped. In this respect, it would be desirable if a device were provided that were capable of being adjusted for transporting coolers of various sizes.

Throughout the years, a number of innovations have been developed relating to devices for transporting coolers, and the following U.S. Pat. Nos. are representative of some of those innovations: 4,724,681; 4,846,493; and 5,169,164. More specifically, the above-cited U.S. patents share a common feature. Each of the cited cooler transporters is a two-wheeled device. As such the combined weight of the cooler, the contents of the cooler, and the device itself are concentrated on only two wheels. Such a concentration of weight of on only two wheels may be inconvenient on soft surfaces such as sand, and the heavily weighted-down pair of wheels may tend to sink into such soft surfaces. In this respect, it would be desirable if a device were provided for transporting a portable cooler which did not employ only two wheels for supporting the cooler.

Another disadvantage of a cooler transporter that has only two wheels is that the cooler is tilted when the cooler is transported. When a cooler is tilted, the contents within the cooler may be spilled. In this respect, it would be desirable if a device were provided for transporting a cooler that does require tilting of the cooler during transport.

Other devices for transporting box-like containers are designed for transporting luggage. For example, the following U.S. Pat. Nos. disclose such luggage carriers: 3,891,245 and 3,963,256. More specifically, U.S. Pat. No. 3,891,245 discloses a luggage transporter that employs only two wheels, and the disadvantages of two-wheeled cooler transporters is described above.

U.S. Pat. No. 3,963,256 discloses a luggage carrier that has four wheels. There is a front pair of wheels and a rear pair of wheels. The two pairs of wheels are separated by a complex lever and fulcrum apparatus. The luggage is attached to the carrier with two elastic straps, one at each end of the luggage. Rather than using a complex system of levers and fulcrums, it would be desirable if a cooler transporter device were provided which did not employ a complex system of levers and fulcrums.

A cooler generally has a lid portion that is lifted off of a body portion to gain access to the contents of the cooler. It is noted that the two elastic straps disclosed in U.S. Pat. No. 3,963,256 would not permit easy removal of a lid portion and would not permit easy access to the contents of a cooler. In this respect, it would be desirable if a device were provided for transporting a cooler that permits easy removal of a cooler lid and permits easy access to the contents of the cooler.

Still other features would be desirable in a cooler carrier apparatus. In a four-wheeled cooler transporter, it would be desirable if the transporter were pulled by a handle that is hinged with respect to a four-wheeled carriage. With such a hinged handle, transmittal of shocks to the person pulling on the handle from the carriage resulting from the carriage encountering rough terrain would be kept to a minimum.

When the cooler is placed on the carriage, it would be desirable if the cooler can be readily secured to the carriage. Conversely, when the cooler is to removed from the carriage, it would be desirable if the cooler can be readily removed from the carriage.

When the cooler carrier apparatus is not in use, it would be desirable if the apparatus can be reduced in size to occupy a reduced amount of space during storage.

Thus, while the foregoing body of prior art indicates it to be well known to use wheeled transporters for portable coolers, the prior art described above does not teach or suggest a cooler carrier apparatus which has the following combination of desirable features: (1) permits transport of a heavy cooler without needing two people to carry the cooler; (2) is capable of being adjusted for transporting coolers of various sizes; (3) does not employ only two wheels for supporting the cooler; (4) does not require tilting of the cooler during transport; (5) does not employ a complex system of levers and fulcrums for supporting a cooler; (6) permits easy removal of a cooler lid and permits easy access to the contents of the cooler; (7) is pulled by a handle that is hinged with respect to a four-wheeled carriage; (8) provides for a cooler to be readily secured to a carriage; (9) provides for a cooler to be readily removed from the carriage; and (10) can be reduced in size to occupy a reduced amount of space during storage. The foregoing desired characteristics are provided by the unique cooler carrier apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved container carrier apparatus which includes a first support assembly which includes a first end portion and a second end portion. A second support assembly includes a first end portion and a second end portion. A third support assembly is connected between the first support assembly and the second support assembly. The third support assembly includes a first end and a second end. The first end of the third support assembly is connected to the first support assembly and the second end of the third support assembly is connected to the second support assembly. The third support assembly is connected to the first support assembly and the second support assembly such that the third support assembly, the first support assembly, and the second support assembly are coplanar in a support plane.

A pair of first lateral retention assemblies is connected to the first support assembly, wherein one of the first lateral retention assemblies is connected to the first end portion of the first support assembly and wherein another of the first lateral retention assemblies is connected to the second end portion of the first support assembly. The first lateral retention assemblies project perpendicularly from the support plane. A pair of second lateral retention assemblies is connected to the second support assembly, wherein one of the second lateral retention assemblies is connected to the first end portion of the second support assembly and wherein another of the second lateral retention assemblies is connected to the second end portion of the second support assembly. The second lateral retention assemblies project perpendicularly from the support plane.

A hinge assembly is connected to either the first support assembly or the second support assembly. A handle assembly is connected to the hinge assembly, and four wheels are attached to the respective end portions of the respective first and second support assemblies.

The third support assembly is connected to the first support assembly at a mid-portion of the first support assembly. Similarly, the third support assembly is connected to the second support assembly at a mid-portion of the second support assembly.

The third support assembly includes a first portion connected to the first support assembly. A second portion is connected to the second support assembly, and a third portion is adjustably connected between the first portion and the second portion such that an effective length of the third support assembly can be adjusted. The third portion of the third support assembly is connected telescopically between the first portion and the second portion of the third support assembly.

Clamping assemblies are connected to the first lateral retention assemblies and to the second lateral retention assemblies for clamping a container between the respective lateral retention assemblies. Each of the clamping assemblies includes a pair of threaded apertures in the lateral retention assemblies, and a complementarily threaded bolt adapted to be screwed through the threaded apertures and to extend to contact a container supported by the first, second, and third support assemblies. The first lateral retention assemblies and the second lateral retention assemblies are parallel to one another.

The first support assembly and the first lateral retention assemblies are formed as a unified integrated structure. Similarly, the second support assembly and the second lateral retention assemblies are formed as a unified integrated structure.

The hinge assembly includes a hinge pin bracket attached to the first support assembly or the second support assembly. A hinge pin supported by the hinge pin bracket, and a pair of apertures in the handle assembly for receiving the hinge pin.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved cooler carrier apparatus which has all of the advantages of the prior art and none of the disadvantages.

It is another object of the present invention to provide a new and improved cooler carrier apparatus which may be easily and efficiently manufactured and marketed.

It is a further object of the present invention to provide a new and improved cooler carrier apparatus which is of durable and reliable construction.

An even further object of the present invention is to provide a new and improved cooler carrier apparatus which is susceptible of a low cost of manufacture with regard to both materials and labor, and which accordingly is then susceptible of low prices of sale to the consuming public, thereby making such cooler carrier apparatus available to the buying public.

Still yet a further object of the present invention is to provide a new and improved cooler carrier apparatus which permits transport of a heavy cooler without needing two people to carry the cooler.

Still another object of the present invention is to provide a new and improved cooler carrier apparatus that is capable of being adjusted for transporting coolers of various sizes.

Yet another object of the present invention is to provide a new and improved cooler carrier apparatus which does not employ only two wheels for supporting the cooler.

Even another object of the present invention is to provide a new and improved cooler carrier apparatus that does not require tilting of the cooler during transport.

Still a further object of the present invention is to provide a new and improved cooler carrier apparatus which does not employ a complex system of levers and fulcrums for supporting a cooler.

Yet another object of the present invention is to provide a new and improved cooler carrier apparatus that permits easy removal of a cooler lid and permits easy access to the contents of the cooler.

Still another object of the present invention is to provide a new and improved cooler carrier apparatus which is pulled by a handle that is hinged with respect to a four-wheeled carriage.

Yet another object of the present invention is to provide a new and improved cooler carrier apparatus that provides for a cooler to be readily secured to a carriage.

Still a further object of the present invention is to provide a new and improved cooler carrier apparatus that provides for a cooler to be readily removed from the carriage.

Yet another object of the present invention is to provide a new and improved cooler carrier apparatus which can be reduced in size to occupy a reduced amount of space during storage.

These together with still other objects of the invention, along with the various features of novelty which characterize the invention, are pointed out with particularity in the claims annexed to and forming a part of this disclosure. For a better understanding of the invention, its operating advantages and the spedfie objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
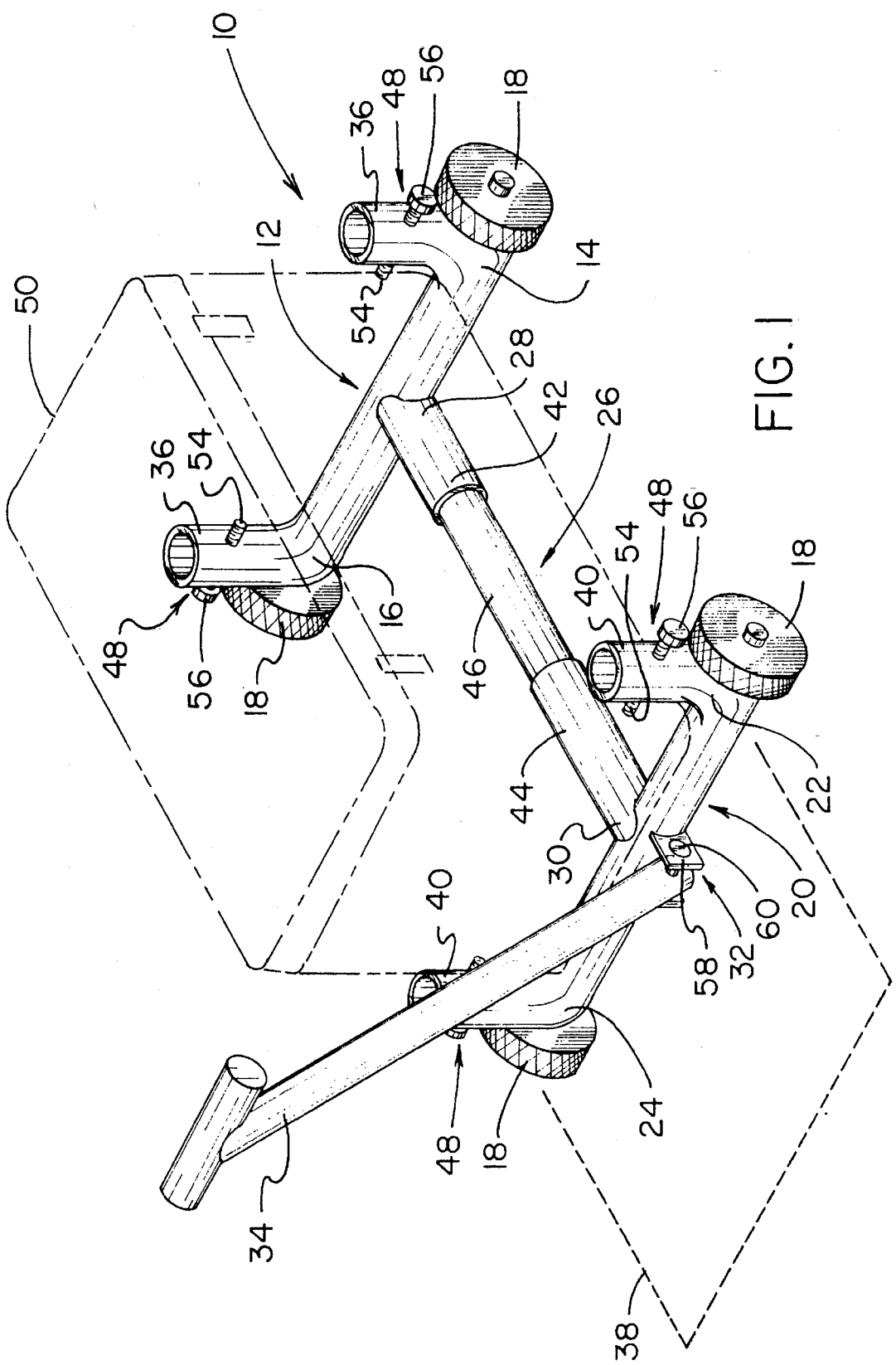
FIG. 1 is a perspective view showing a preferred embodiment of the cooler carrier apparatus of the invention in use carrying a cooler.
Figure 2:
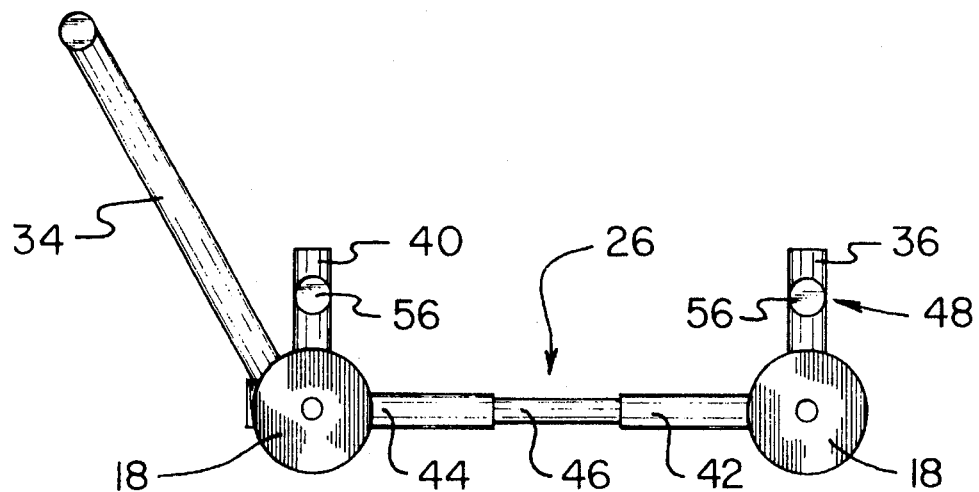
FIG. 2 is a side view of the embodiment of the cooler carrier apparatus shown in FIG. 1 with the cooler removed.
Figure 3:
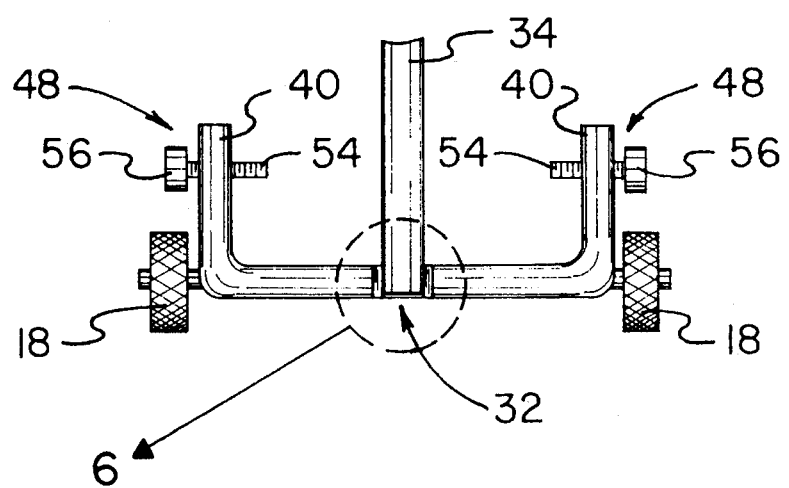
FIG. 3 is a front view of the embodiment of the cooler carrier apparatus of FIG. 2.
Figure 4:
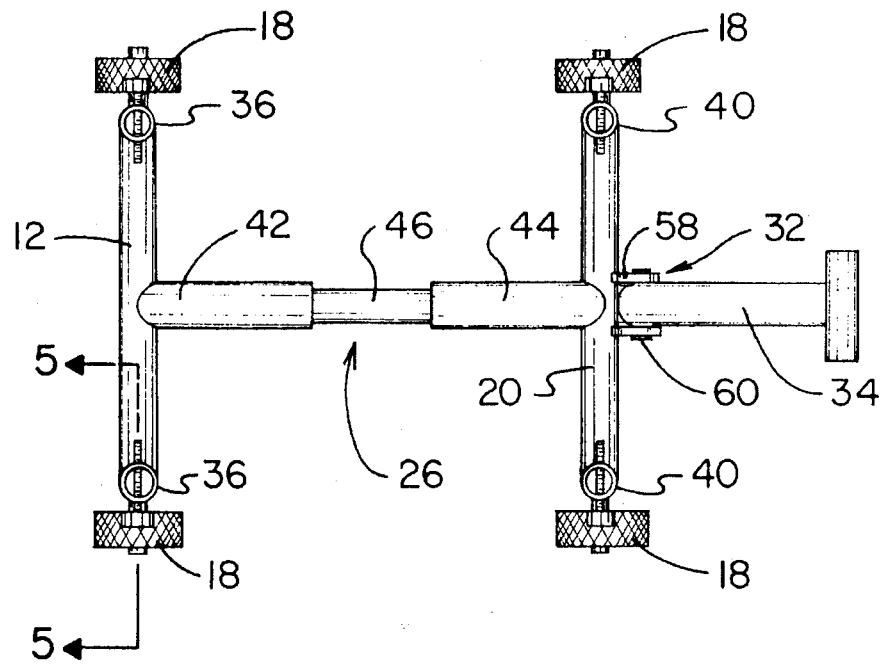
FIG. 4 is a top view of the embodiment of the invention shown in FIG. 2 but reversed in direction with respect to FIG. 2.
Figure 5:
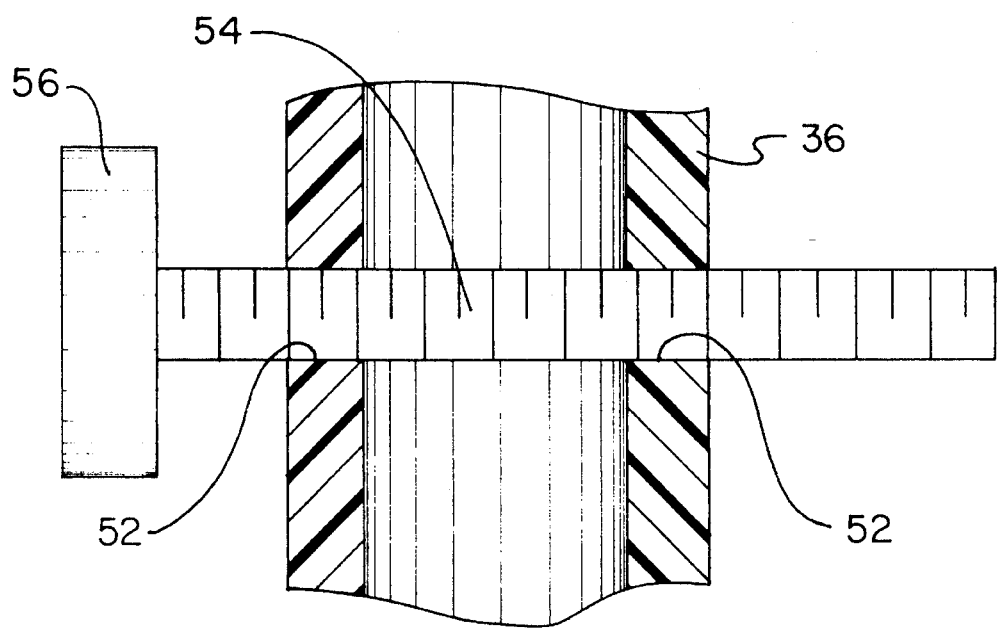
FIG. 5 is an enlarged cross-sectional view of a cooler clamping portion of the embodiment of the invention shown in FIG. 4 taken along line 5—5 of FIG. 4.

With reference to the drawings, a new and improved cooler carrier apparatus embodying the principles and concepts of the present invention will be described.

Turning to FIGS. 1–6, there is shown an exemplary embodiment of the container carrier apparatus of the invention generally designated by reference numeral 10. In its preferred form, the container carrier apparatus 10 of the invention is used for carrying a container which is a cooler and may be referred to as a cooler carrier apparatus 10. The container carrier apparatus 10 includes a first support assembly 12 which includes a first end portion 14 and a second end portion 16. A second support assembly 20 includes a first end portion 22 and a second end portion 24. A third support assembly 26 is connected between the first support assembly 12 and the second support assembly 20. The third support assembly 26 includes a first end 28 and a second end 30. The first end 28 of the third support assembly 26 is connected to the first support assembly 12 and the second end 30 of the third support assembly 26 is connected to the second support assembly 20. The third support assembly 26 is connected to the first support assembly 12 and the second support assembly 20 such that the third support assembly 26, the first support assembly 12, and the second support assembly 20 are coplanar in a support plane 38.

A pair of first lateral retention assemblies 36 is connected to the first support assembly 12, wherein one of the first lateral retention assemblies 36 is connected to the first end portion 14 of the first support assembly 12 and wherein another of the first lateral retention assemblies 36 is connected to the second end portion 16 of the first support assembly 12. The first lateral retention assemblies 36 project perpendicularly from the support plane 38. A pair of second lateral retention assemblies 40 is connected to the second support assembly 20, wherein one of the second lateral retention assemblies 40 is connected to the first end portion 22 of the second support assembly 20 and wherein another of the second lateral retention assemblies 40 is connected to the second end portion 24 of the second support assembly 20. The second lateral retention assemblies 40 project perpendicularly from the support plane 38.

A hinge assembly 32 is connected to either the first support assembly 12 or the second support assembly 20. A handle assembly 34 is connected to the hinge assembly 32, and four wheels 18 are attached to the respective end portions of the respective first and second support assemblies.

The third support assembly 26 is connected to the first support assembly 12 at a mid-portion of the first support assembly 12. Similarly, the third support assembly 26 is connected to the second support assembly 20 at a mid-portion of the second support assembly 20.

The third support assembly 26 includes a first portion 42 connected to the first support assembly 12. A second portion 44 is connected to the second support assembly 20, and a third portion 46 is adjustably connected between the first portion 42 and the second portion 44 such that an effective length of the third support assembly 26 can be adjusted. The third portion 46 of the third support assembly 26 is connected telescopically between the first portion 42 and the second portion 44 of the third support assembly 26.

Clamping assemblies 48 are connected to the first lateral retention assemblies 36 and to the second lateral retention assemblies 40 for clamping a container 50 between the respective lateral retention assemblies. The container 50 is a portable cooler 50. As shown best in FIG. 5, each of the damping assemblies 48 includes a pair of threaded apertures 52 in the lateral retention assemblies, and a complementarily threaded bolt 54 adapted to be screwed through the threaded apertures 52 and to extend to contact a container 50 supported by the first, second, and third support assemblies. The threaded bolt 54 has a handle 56 for facilitating turning of the bolt 54. The first lateral retention assemblies 36 and the second lateral retention assemblies 40 are parallel to one another.

The first support assembly 12 and the first lateral retention assemblies 36 are formed as a unified integrated structure. Similarly, the second support assembly 20 and the second lateral retention assemblies 40 are formed as a unified integrated structure.

Figure 6:
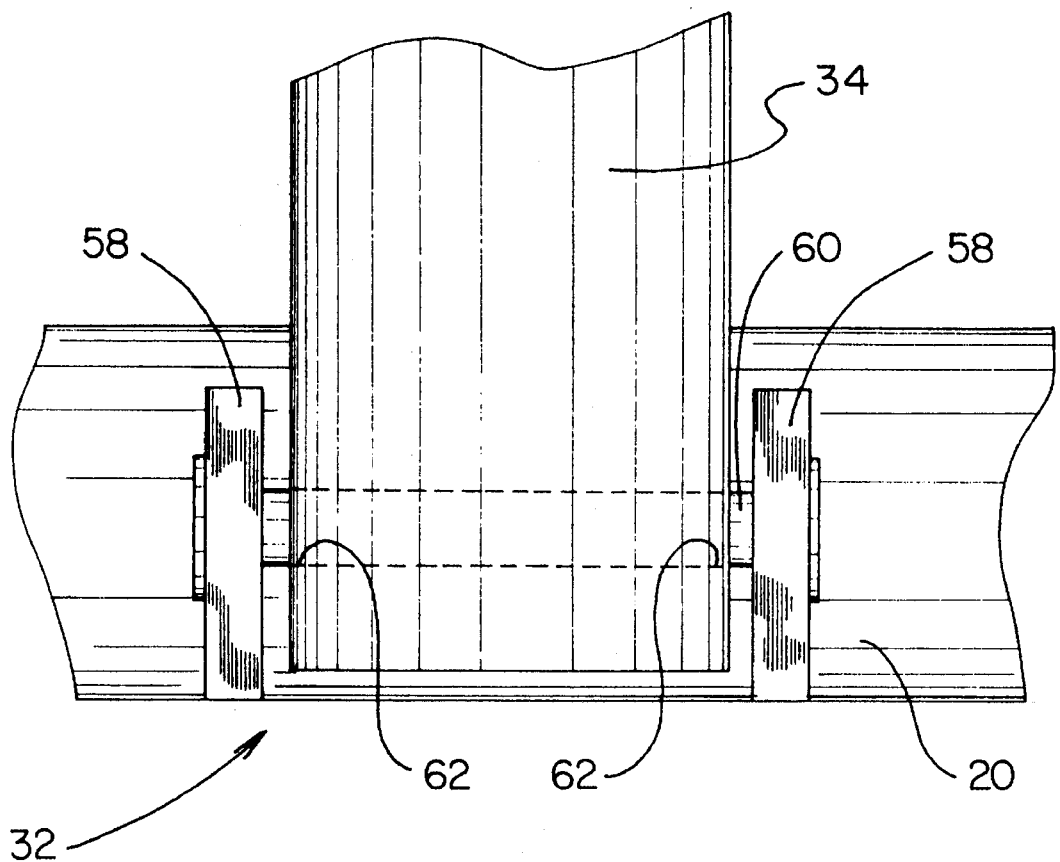
FIG. 6 is an enlarged view of the hinge structure for the handle shown in the circled region 6 of the embodiment of the invention shown in FIG. 3.

As shown best in FIG. 6, the hinge assembly 32 includes a hinge pin bracket 58 attached to the first support assembly 12 or the second support assembly 20. A hinge pin 60 supported by the hinge pin bracket 58, and a pair of apertures 62 in the handle assembly 34 for receiving the hinge pin 60.

In use, the effective length of the container carrier apparatus of the invention is adjusted by moving the first support assembly 12 and the second support assembly 20 apart so that the telescopic portion of the third support assembly 26 are moved relative to each other. The effective length is adjusted so that a portion of the container 50 is supported by the first support assembly 12 and a portion of the container 50 is supported by the second support assembly 20. The clamping assemblies 48 are then adjusted to clamp the container 50 therebetween. More specifically, the handles 56 of the clamping assemblies 48 are turned so that the threaded bolts 54 clamp against the container 50. When the container 50 is clamped between all four clamping assemblies 48, the container 50 serves to lock the effective length of the third support assembly 26 into the selected length.

The handle assembly 34 is then grasped, and the container carrier apparatus is pulled by the handle assembly 34 whereby the container carrier apparatus rolls on the wheels 18. Because the clamping assemblies 48 clamp against the sides of the container 50, one is free to remove the lid of the container 50 and is free to gain easy access to the contents of the container 50.

To remove the container 50 from the apparatus of the invention, the clamping assemblies 48 are loosened, the container 50 is lifted off of the first, second, and third support assemblies, and the first support assembly 12 and the second support assembly 20 are pushed toward each other to reduce the effective length of the telescoping third support assembly 26.

The components of the cooler carrier apparatus of the invention can be made from inexpensive and durable metal and plastic materials. Preferably, the first support assembly, the second support assembly, the third support assembly, the handle assembly, and the lateral retention assemblies are made from tubing materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved cooler carrier apparatus that is low in cost, relatively simple in design and operation, and which may advantageously be used to transport of a heavy cooler without needing two people to carry the cooler. With the invention, a cooler carrier apparatus is provided which is capable of being adjusted for transporting coolers of various sizes. With the invention, a cooler carrier apparatus is provided which does not employ only two wheels for supporting the cooler. With the invention, a cooler carrier apparatus is provided which does not require tilting of the cooler during transport. With the invention, a cooler carrier apparatus is provided which does not employ a complex system of levers and fulcrums for supporting a cooler. With the invention, a cooler carrier apparatus is provided which permits easy removal of a cooler lid and permits easy access to the contents of the cooler. With the invention, a cooler carrier apparatus is provided which is pulled by a handle that is hinged with respect to a four-wheeled carriage. With the invention, a cooler carrier apparatus is provided which provides for a cooler to be readily secured to a carriage. With the invention, a cooler carrier apparatus is provided which provides for a cooler to be readily removed from the carriage. With the invention, a cooler carrier apparatus is provided which can be reduced in size to occupy a reduced amount of space during storage.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A new and improved container carrier apparatus, comprising:

a first support assembly which includes a first end portion and a second end portion, a second support assembly which includes a first end portion and a second end portion, a third support assembly connected between said first support assembly and said second support assembly, said third support assembly including a first end and a second end, said first end of said third support assembly connected to said first support assembly at a midportion of said first support assembly and said second end of said third support assembly connected to said second support assembly at a midportion of said second support assembly, said third support assembly connected to said first support assembly and said second support assembly such that said third support assembly, said first support assembly, and said second support assembly are coplanar in a support plane, a pair of first lateral retention assemblies connected to said first support assembly, wherein one of said first lateral retention assemblies is connected to said first end portion of said first support assembly, wherein another of said first lateral retention assemblies is connected to said second end portion of said first support assembly, and wherein said first lateral retention assemblies project perpendicularly from said support plane, a pair of second lateral retention assemblies connected to said second support assembly, wherein one of said second lateral retention assemblies is connected to said first end portion of said second support assembly, wherein another of said second lateral retention assemblies is connected to said second end portion of said second support assembly, and wherein said second lateral retention assemblies project perpendicularly from said support plane, a hinge assembly connected to either said first support assembly or said second support assembly, a handle assembly connected to said hinge assembly, four wheels attached to said respective end portions of said respective first and second support assemblies, wherein said wheels rotate around axes which project from said respective end portions of said respective first and second support assemblies, and clamping assemblies connected to said first lateral retention assemblies and to said second lateral retention assemblies for clamping a container between said respective lateral retention assemblies, wherein each of said clamping assemblies includes a pair of threaded apertures in said lateral retention assemblies, and a complementarily threaded bolt adapted to be screwed through said threaded apertures and to extend to directly contact and directly clamp a container supported by said first, second, and third support assemblies, wherein said threaded bolts on said first lateral retention assemblies clamp the container therebetween, and wherein said threaded bolts on said second lateral retention assemblies clamp the container therebetween.

2. The apparatus described in claim 1 wherein third support assembly includes:

a first portion connected to said first support assembly, a second portion connected to said second support assembly, and a third portion adjustably connected between said first portion and said second portion such that an effective length of said third support assembly can be adjusted.

3. The apparatus described in claim 2 wherein said third portion of said third support assembly is connected telescopically between said first portion and said second portion of said third support assembly.

4. The apparatus described in claim 1 wherein said first lateral retention assemblies and said second lateral retention assemblies are parallel to one another.

5. The apparatus described in claim 1 wherein said first support assembly and said first lateral retention assemblies are formed as a unified integrated structure.

6. The apparatus described in claim 1 wherein said second support assembly and said second lateral retention assemblies are formed as a unified integrated structure.

7. The apparatus described in claim 1 wherein said hinge assembly includes:

a hinge pin bracket attached to said first support assembly or said second support assembly, a hinge pin supported by said hinge pin bracket, and a pair of apertures in said handle assembly for receiving said hinge pin.

* * * * *